United States Patent Office 3,149,055
Patented Sept. 15, 1964

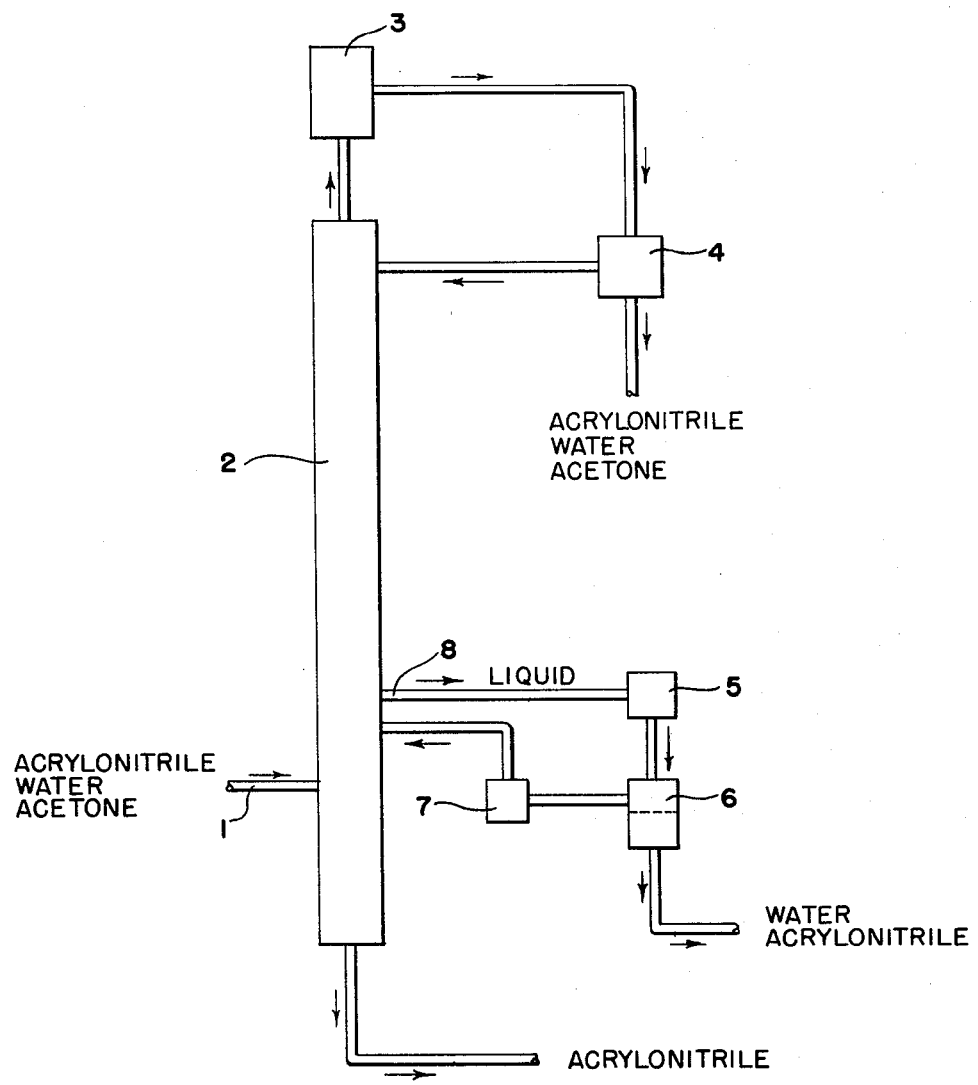

3,149,055
PURIFICATION OF OLEFINICALLY UNSATURATED NITRILES
John W. Hougland, Cleveland, Ohio, assignor to The Standard Oil Company, Cleveland, Ohio, a corporation of Ohio
Filed Aug. 22, 1962, Ser. No. 218,512
5 Claims. (Cl. 202—40)

This invention relates to the purification of olefinically unsaturated nitriles, such as acrylonitrile, to separate them from water and from small amounts of saturated carbonyl compounds, such as acetone.

When an olefin, such as propylene or isobutylene, is reacted with ammonia and oxygen to produce the corresponding unsaturated nitrile, such as acrylonitrile or methacrylonitrile, there are also produced small amounts of carbonyl compounds of relatively low molecular weight, such as acetaldehyde, propionaldehyde, acrolein, methacrolein, acetone, methyl ethyl ketone, etc.

The separation of olefinically unsaturated carbonyl compounds, when they are present in trace amounts, presents no problem since these are homo-polymerizable under the normal distillation conditions and do not require any treatment, treating steps, or treating agent in order that they may be separated from the unsaturated nitrile. The acrolein, for example, without treatment, does not go overhead when acrylonitrile is distilled but remains in the wash water from the absorber.

The saturated carbonyl compounds, however, present troublesome purification problems, because they do not polymerize and trace amounts of these present in an unsaturated nitrile-water mixture are extremely difficult to remove by distillation procedures.

In accordance with the present invention, saturated carbonyl compounds can be effectively separated from the unsaturated nitrile so that the latter can be recovered substantially free from saturated carbonyl compounds, i.e., less than a total of 300 parts per million maximum and generally well under 100 parts per million.

A discussion of the problems involved in separating mixtures comprising acrylonitrile, acetone and water, as well as a means for accomplishing the separation by distilling in the presence of gross amounts of added water, is given in U.S. Patent No. 2,681,306.

In accordance with the present invention, the saturated carbonyl compounds can be separated effectively from unsaturated nitrile and the unsaturated nitrile can be separated effectively from water in a single distillation apparatus.

The accompanying drawing illustrates one method for conducting the process of this invention. In referring to the drawing it can be seen that the feed stream of acrylonitrile, water and acetone is introduced into the apparatus at 1 which is less than half way up the length of the fractional distillation column 2. The distillation vapors are condensed in the vapor condenser 3 and the condensate then passes to the condensate divider 4 where a small portion of the condensed mixture of acrylonitrile, water and acetone is removed and the major portion of the condensate is returned to the top of the column. A portion of the refluxing liquid is withdrawn 8 from the column above the feed stream inlet 1 and the withdrawn liquid is cooled in the liquid cooler 5. The cooled liquid is then transferred to the decanter for separating liquid phases 6 where the water layer is removed and the organic layer is transferred to the liquid heater 7 to be heated and returned to the distillation column. As a specific illustration of the process embodied herein, the distillation of a mixture of acrylonitrile, water and acetone containing 1000 parts per million of acetone and 3.5% by weight of water was carried out in a 45 actual plate distillation column. The feed mixture was introduced continuously on the tenth plate of the distillation column and at the fifteenth plate, one-half of the down-flowing liquid was withdrawn from the column and cooled to about 100° F. Upon cooling, the withdrawn portion separated into two phases, a water phase and an organic phase. The water was removed from the two-phase system, the organic phase was reheated to the boiling point and returned to the column at the fifteenth plate. Enough heat is supplied at the bottom of the column to provide a vapor build-up equal to at least twice the feed rate. The upper portion of the column was operated at an efficient reflux ratio of 500:1. The overhead material withdrawn had an acetone content of 40% by weight. The bottoms stream was composed of acrylonitrile, less than 300 parts per million of acetone and less than 0.1% by weight of water.

In order to carry out the process of the present invention effectively, the fractionating column should have no fewer than about 45 plates. Increasing the number of plates in the column would permit a slight improvement in the efficiency of the impurity removal and the overhead reflux ratio could be lowered accordingly. Preferably a column with from about 45 to 55 plates is used with feed introduced at an intermediate point as from 0.2 to 0.4 and preferably from .22 to .3 the distance from the bottom to the top of the column. The two-phase liquid mixture is removed at an intermediate point which is always above the point where the feed enters and is preferably from about 0.3 to 0.4 the distance from the bottom to the top of the column. In the operation of the process embodied herein, the mole ratio of the liquid downflow to the vapor upflow in the column is from about 1 to about 2 and preferably about 1.5.

By the process of this invention, the acetone and other volatiles are forced out of the column at the top, preferably at a reflux ratio of from about 300:1 to 1000:1 and the arcrylonitrile is recovered from the bottoms stream. The acrylonitrile recovered from the process of this invention is highly suitable for homopolymerization or copolymerization. Furthermore, very little acrylonitrile is lost in the overhead take-off step. The instant process is advantageous in that two impurities, namely acetone and water, are substantially completely removed from acrylonitrile in a single distillation column in a simple but unobvious and unexpected manner.

I claim:
1. The process for purification of an olefinically unsaturated nitrile selected from the group consisting of acrylonitrile and methacrylonitrile which contains small amounts of water and a saturated carbonyl compound comprising:
   (A) Continuously feeding the impure nitrile into a fractional distillation column having at least about 45 plates at an intermediate point between the top and bottom of the column;
   (B) Condensing the overhead and maintaining pot and column temperatures such that the mole ratio of the liquid downflow to the vapor upflow in the column is at least 1;
   (C) Maintaining at the top of the fractionation column an overhead reflux ratio of from about 300:1 to 1000:1;
   (D) Continuously withdrawing a portion of the down-flowing liquid at a point in the column which is slightly above the point where the feed is introduced in A and then
      (1) cooling the withdrawn portion until it separates into two liquid phases,

(2) separating the water phase from the organic phase, and discarding the water phase, and
(3) reheating the organic phase and introducing it back into the column at a point slightly above the point at which the feed is introduced, (E) Recovering acrylonitrile from the bottom stream.

2. The process of claim 1 wherein the unsaturated nitrile is acrylonitrile.

3. The process of claim 2 wherein the saturated carbonyl compound is acetone.

4. The process of claim 3 wherein the mole ratio of liquid downflow to vapor upflow in the column is from 1 to 2.

5. The process for purification of acrylonitrile which contains small amounts of water and acetone comprising
(A) Continuously feeding the impure acrylonitrile into a fractional distillation column having from 45 to 55 plates at a point from 0.2 to 0.4 of the distance from the bottom to the top of the column;
(B) Maintaining temperatures within the pot and column such that the mole ratio of downflowing liquid to upflowing vapor is about 1.5;
(C) Condensing the overhead and maintaining an overhead reflux ratio of from about 300:1 to 1000:1 in the fractionation column;
(D) Continuously withdrawing a portion of the downflowing liquid at a point in the column which is from 0.3 to 0.4 of the distance from the bottom to the top of the column and is above the point at which the feed is introduced in A, and then
(1) cooling the withdrawn portion to about 100° F. at which point the portion separates into an organic phase and a water phase,
(2) separating the water phase from the organic phase, discarding the water phase,
(3) reheating the organic phase to its boiling point and reintroducing it into the column at the same level from which it was withdrawn,
(E) Recovering acrylonitrile containing less than 300 parts per million of acetone and less than 0.1% by weight of water from the bottom stream.

References Cited in the file of this patent
UNITED STATES PATENTS

| | | |
|---|---|---|
| 2,404,163 | Carpenter et al. | July 16, 1946 |
| 2,608,576 | Pietrusza et al. | Aug. 26, 1952 |
| 2,681,306 | Kemp et al. | June 15, 1954 |
| 3,051,630 | Hadley et al. | Aug. 28, 1962 |
| 3,073,753 | Hadley et al. | Jan. 15, 1963 |

UNITED STATES PATENT OFFICE
CERTIFICATE OF CORRECTION

Patent No. 3,149,055                 September 15, 1964

John W. Hougland

It is hereby certified that error appears in the above numbered patent requiring correction and that the said Letters Patent should read as corrected below.

Column 2, line 60, strike out "Condensing the overhead and"; same line 60, for "maintaining" read -- Maintaining --; line 64, strike out "Maintaining", and insert instead -- Condensing the overhead and maintaining --; column 3, line 6, for "bottom" read -- bottoms --.

Signed and sealed this 26th day of January 1965.

(SEAL)
Attest:

ERNEST W. SWIDER
Attesting Officer

EDWARD J. BRENNER
Commissioner of Patents